United States Patent
Zehler et al.

(10) Patent No.: US 9,367,271 B2
(45) Date of Patent: Jun. 14, 2016

(54) SYSTEM AND METHOD FOR ACHIEVING TAP-TO-PRINT FUNCTIONALITY ON A MOBILE DEVICE

(71) Applicant: Xerox Corporation, Norwalk, CT (US)

(72) Inventors: Peter Zehler, Penfield, NY (US); Gavan Leonard Tredoux, Penfield, NY (US); Premkumar Rajendran, Webster, NY (US); Kanishk Jain, Jersey City, NJ (US); Roger T. Kramer, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/525,473

(22) Filed: Oct. 28, 2014

(65) Prior Publication Data

US 2016/0117136 A1   Apr. 28, 2016

(51) Int. Cl.
*G06F 3/12* (2006.01)
*G06K 15/00* (2006.01)

(52) U.S. Cl.
CPC ............ *G06F 3/1228* (2013.01); *G06F 3/1205* (2013.01); *G06F 3/1268* (2013.01); *G06F 3/1292* (2013.01)

(58) Field of Classification Search
CPC ... G06F 3/1228; G06F 3/1205; G06F 3/1268; G06F 3/1292
See application file for complete search history.

(56) References Cited

U.S. PATENT DOCUMENTS

| | | | |
|---|---|---|---|
| 8,571,602 B2 | 10/2013 | Horton et al. | |
| 2009/0103124 A1* | 4/2009 | Kimura | G06F 3/1204 358/1.15 |
| 2009/0144629 A1 | 6/2009 | Ferlitsch et al. | |
| 2011/0231837 A1* | 9/2011 | Sheehan | G06F 8/63 717/175 |
| 2013/0038896 A1 | 2/2013 | Nalewajek | |
| 2013/0077568 A1* | 3/2013 | Mizutani | H04W 36/0083 370/328 |
| 2013/0094047 A1 | 4/2013 | Bailey et al. | |
| 2013/0201515 A1 | 8/2013 | Daos et al. | |
| 2013/0215467 A1 | 8/2013 | Fein et al. | |
| 2013/0342870 A1 | 12/2013 | Kodimer et al. | |
| 2014/0253964 A1* | 9/2014 | Asai | G06F 3/1268 358/1.15 |

* cited by examiner

*Primary Examiner* — Barbara Reinier
*Assistant Examiner* — Henok A Shiferaw
(74) *Attorney, Agent, or Firm* — Fox Rothschild LLP (57) ABSTRACT

A method of printing a document from a mobile device coupling the mobile device to a print device. The method may also include launching a tap-to-print application software on the mobile device in response to the coupling, identifying a document to be printed via the tap-to-print application, and transmitting the document to be printed to the print device by the tap-to-print application. The tap-to-print application does not modify an operating system of the mobile device.

19 Claims, 4 Drawing Sheets

SYSTEM AND METHOD FOR ACHIEVING TAP-TO-PRINT FUNCTIONALITY ON A MOBILE DEVICE

BACKGROUND

Currently, mobile devices such as smartphones, notebook and laptop computers, PDAs (personal digital assistants), tablet computing devices, and so forth, are becoming extremely prolific, and are extensively used to provide convenient storage and/or viewing of various documents and data. Such devices are able to store the documents and data of the user, and allow the user to access such information in many different locations. When users with such mobile devices wish to print documents, files or other information stored on the mobile devices, information is transmitted within a print aware mobile application using an operating system resident print client subsystem or by a dedicated print client mobile application, to a print device directly or through an intermediate processing device.

These, and numerous other functionalities, are generally performed by software applications either in the form of software components that are built-in to the device's mobile operating system (OS) or separate mobile applications (mobile apps) that run on top of the operating system. A variety of mobile applications have been developed that enable direct transmission of data from a mobile device to a print device. However, such mobile applications often require extensive modifications to the mobile operating system (OS) as well as the print device, and hence need to be OS and device specific. Such modifications allow the mobile application to, for example, identify documents being viewed by other applications and selecting them to be transmitted to the print device.

Such modifications are necessary because of "sandboxing" on mobile platforms. Various OSs enforce security between mobile applications such that one mobile application cannot determine the state information of another application. Identity of a document being viewed in a mobile application is an example of state information which is not accessible to other applications. Hence, the only way to identify a document to be printed is for all the mobile applications to become print subsystem aware, i.e., as OS resident or as an add-on, by modifying the OS.

The current disclosure discloses a system and method to achieve desired tap-to-print functionality without requiring print device or mobile device modifications, by using features of both devices that are widely deployed and available.

SUMMARY

In one general respect, the embodiments disclose a method of printing a document from a mobile device. The method may include coupling the mobile device to a print device. The method may also include launching a tap-to-print software application on the mobile device in response to the coupling, identifying a document to be printed via the tap-to-print application, and transmitting the document to be printed to the print device by the tap-to-print application. The tap-to-print application does not modify an operating system of the mobile device.

In various embodiments, identifying the document to be printed via the tap-to-print application may include determining a time $t_0$ at which the coupling occurred; detecting a triggering event with respect to a most recent document at time $t_n$; determining a threshold time value, T; and determining, whether $(t_0-t_n) \leq T$. The method may further include identifying the most recent document as the document to be printed if it is determined that $(t_0-t_n) \leq T$, else prompting a user of the mobile device to identify a second document as the document to be printed.

In certain embodiments, determining the threshold time value T may be based on at least a type of the most recent document, a type of the triggering event, and past user behavior. In some other embodiments, the triggering event may include one or more of the following: downloading the first document, opening the first document, reading the first document, creating the first document, and editing the first document. In an embodiment, the method may also include detecting a user selection of a file for display, determining a file type of the file, determining if the tap-to-print application has user permission to display the file type, saving a copy of the file in the tap-to-print software application local database if it is determined that tap-to-print application has user permission to display the file type, and sending the file to an appropriate mobile application for display to the user.

Optionally, the method may also include determining whether or not the print device is capable of printing the print document.

In some embodiments, coupling the mobile device to the print device may include establishing a near field communications link upon detection that the mobile device and the print device are within a communication range of each other.

The method may further include establishing a secondary communications link between the mobile device and the print device, wherein the secondary communication link has a communication range that is larger than that of the near field communications link.

Optionally, transmitting a job ticket from the mobile device to the print device. In some other embodiments, the method may include prompting a user of the mobile device to verify the identified print document.

In another general respect, the embodiments disclose a system of printing a document from a mobile device. The system may include a non-transitory, computer readable memory; one or more processors; and a computer-readable medium containing programming instructions that, when executed by the one or more processors, cause the system to execute a tap-to-print application on the mobile device, and couple the mobile device to a print device. The programming instructions may also include instructions that, when executed by the one or more processors, cause the system to launch the tap-to-print application software on the mobile device in response to the coupling, identify a document to be printed via the tap-to-print application, and transmit the document to be printed to the print device by the tap-to-print application. The tap-to-print application does not modify an operating system of the mobile device.

In yet another general aspect, the embodiments disclose q non-transitory machine-readable medium containing programming instructions that, when executed cause a processor to perform the methods disclosed above.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

A "mobile device" or "mobile electronic device" refers to a portable computing device that includes an image capturing device, a processor and non-transitory, computer-readable memory. The memory may contain programming instructions in the form of a software application that, when executed by the processor, causes the device to perform one or more print document identifying operations. Examples of suitable portable electronic devices include smartphones, personal digital assistants, cameras, tablet devices, electronic readers, personal computers, media players, satellite navigation devices and the like.

A "print device" refers to a device that includes a print engine for printing a document. The print device may also include a near field communication (NFC) interface used to communicate with one or more other devices, a processor that can process the document and a memory unit for storage of the documents or portions of the document. Any suitable print device can be used including, but not limited to, inkjet and laser print devices and multifunction devices.

Figure 1:
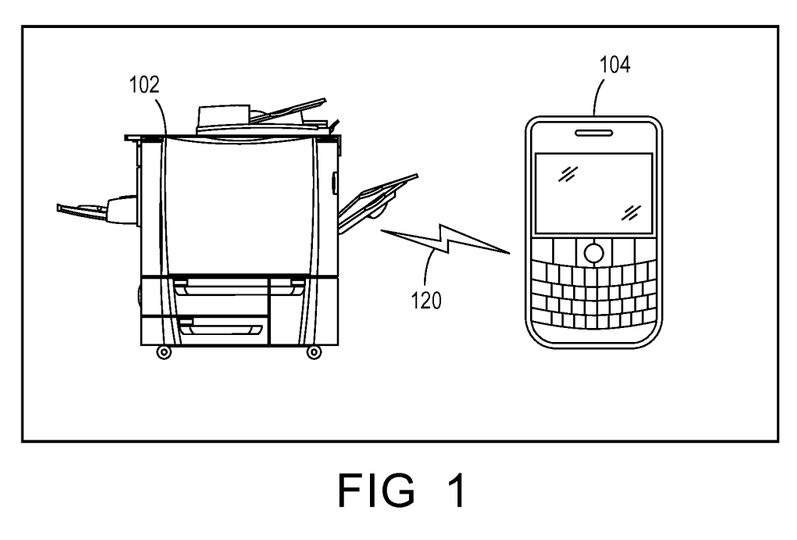
FIG. 1 is a schematic illustration of a system for achieving tap-to-print functionality according to an embodiment.

FIG. 1 shows an example connection of a print device 102 and a mobile device 104 over a near field communication (NFC) interface 120 in accordance with the principles of the current disclosure. In some embodiments, the NFC interface 120 can be embodied as a circuit or similar electronic component or components that allows for contactless communication between devices that are located very close to one another. As an example, each device may be equipped with an NFC tag that permits NFC communication between the devices. An NFC tag may be simply affixed to the print device 102 as a static tag or the tag may be integrated into the communications interface of the print device 102 as a dynamic tag that is powered by the print device 102.

Near field communications are defined by a collection of standards for radio frequency communications that may be used when two devices are in close proximity. Protocols for implementation of near field communication may comply with industry standards, such as ISO/IEC 18092 or ISO/IEC 18000-3, published by the International Standards Organization. Typical ranges for near field communications are approximately 10 cm or less, although it may be 20 cm or less, 4 cm or less, or other ranges. Near field communications can support two-way (or peer-to-peer) communications between devices. In a passive mode, an NFC initiator device may output a carrier field that a target device (or transponder) uses to respond by modulating the provided field. In an active mode, the initiator and the target can each generate a carrier field, and the devices communicate by altering the fields. When utilizing two-way communications, two devices may exchange data to perform various functionalities that are enabled as a result of the near field communications.

The print device 102 may be configured to enable near field communication with a variety of NFC enabled devices including NFC enabled mobile devices and NFC tags. The NFC tag may include information to be transmitted to other NFC enabled devices. The functionality performed by the print device may be implemented via execution of a local print device application or some of the functionality may be performed via processing that occurred at a host processor or a server connected via a network or a cloud device.

Near field communications require close proximity (e.g., no more than a few inches, or in some cases no more than one or two feet) to establish a communications link, and hence the operation of establishing a link with another NFC device may be referred to as a "tap." The term "tap" as used herein does not necessarily refer to physical contact between communicating NFC devices, but rather positioning the NFC devices in sufficiently close proximity to establish an NFC communications link. Therefore, a user of an NFC enabled smart phone may tap an NFC tag to send and/or receive data from the tag. Near field communications offers several advantages over other wireless protocols and methods for encoding data to be read by a mobile terminal because of the short range nature of near field communications. Some examples include avoiding cross-talk from other nearby tags, managing access, improving security, and low power requirements. NFC tags may also be configured such that when read by the mobile terminal, cause the mobile terminal to perform certain processing actions, such as launching of applications, navigating to a particular website, or downloading of a particular file.

In some embodiments, the NFC tag may be operable to initiate a direct or indirect network connection between an NFC enabled device (e.g., the mobile device 104) and the print device 102 via a network protocol other than NFC. For example, the specially encoded NFC tag of the print device 102 may respond to a field generated by another NFC enabled device by providing information that identifies network information about the print device 102 (e.g., Bluetooth® address, IP address, MAC address, or the like). In this regard, the print device's NFC tag may transmit a print device identifier for receipt by, for example, the mobile device 104. The mobile device 104 may be configured to identify the print device identifier as being associated with a print device and to launch an application that may begin the process of pairing the mobile device 104 with the print device 102. The NFC interface may also be used to initially authenticate the mobile device and/or the print device.

While the current disclosure relies on NFC to establish the initial connection between a mobile device and a print device, it will be apparent to those skilled in the art that other short-range wireless communication protocols may also be used in accordance with the principles of the current disclosure.

In some embodiments, the communications link may also involve a secondary communications link, such as a Bluetooth® or WiFi link between the mobile device 104 and the print device 102 in addition to the initial NFC link. Upon establishing a higher speed link, the print device 102 may be configured to send/receive data to/from the mobile device 104 to perform various tasks via the higher speed link. The secondary communications link will typically be able to exchange communications over a larger distance than the NFC link. These other communication protocols, once authenticated by the NFC process, may be as secure as the NFC communication process and may operate more quickly when large amounts of data are being exchanged.

In this document, the terms "tap-to-print application" and "tap-to-print software" refer to a software application that is configured to cause an electronic device to perform some or all of the functions that are described in this document.

Figure 2A:
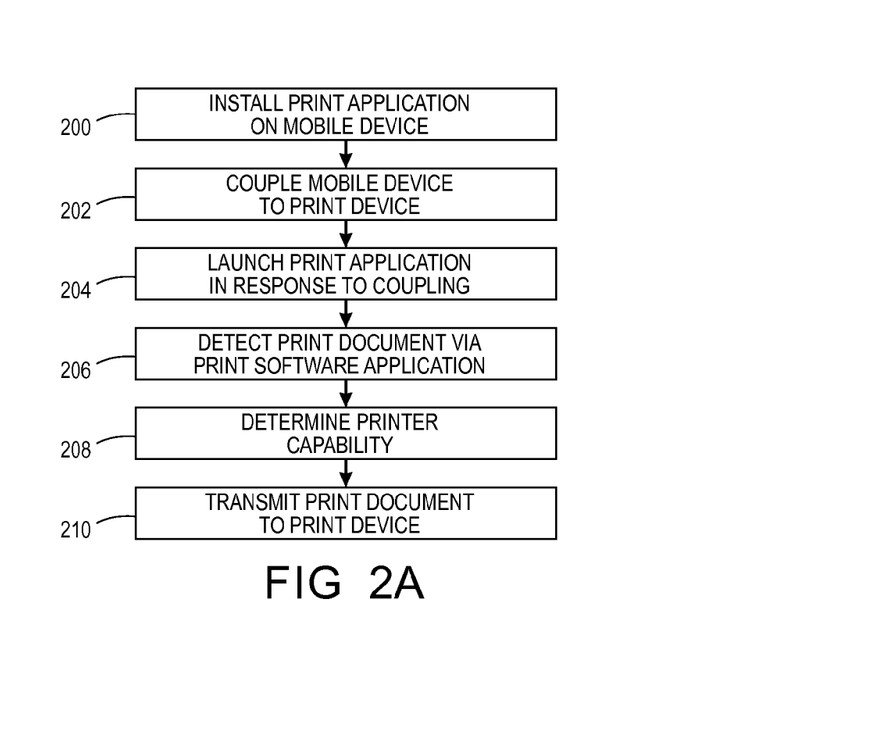
FIG. 2A depicts a flow chart example of a process for printing a document using a mobile device and a print device, according to an embodiment.

FIG. 2A depicts a flow chart example of a process for printing a document from a mobile device according to an embodiment. To begin with, the user of a mobile device may download and install a tap-to-print application on to the mobile device in step 200. The user may acquire the application by downloading it from an application store or from a print service provider. In certain embodiments, the tap-to-print application may be pre-installed on the mobile device. The tap-to-print application may include virtually any application type which may run on any underlying operating system or platform. The installed tap-to-print application registers itself with the mobile operating system without making any modifications to the mobile operating system kernel. Such registration allows the application to monitor certain activities on the mobile operating system. The tap-to-print application operates to identify the document to be printed on the mobile device as discussed later with respect to FIG. 2B.

The tap-to-print application may correspond to a local application which executes on the mobile device. Alternatively, the tap-to-print application may represent a web application which executes on a remote application server. That is, the tap-to-print application may include any application functionality which is accessed by the user over a network and experienced locally as application e.g., using a browser running on the mobile device. Techniques for executing such a web application, and related technology, are well known in the art and are therefore not described further in detail herein, except as may be helpful or necessary to understand operations of system.

In step 202, the user may couple the mobile device to the desired print device. As discussed previously, a user may use any known short range communication protocol, such as NFC, to couple the mobile device to the print device. For example, the user may couple the mobile device to the print device by bringing the NFC enabled mobile device within a communication range (hereinafter referred to as "tap") of the NFC tag attached to and/or incorporated within the print device (discussed previously). Such NFC coupling allows the user to couple the mobile device to the print device without having to exit any applications running on the mobile device. For example, the user may be able to couple the mobile device to the print device while reading a document on the mobile device on a document viewer.

Use of the terms "coupled" and "connected", along with their derivatives, may be used. "Coupled" may be used to indicate that two or more elements are in either direct or indirect (possibly with other intervening elements between them) physical or electrical contact with each other, and/or that the two or more elements co-operate or interact with each other. Coupling means establishing a paired communication link whereby the devices recognize each other and transmit information via NFC or a short range communication protocol.

Prior to the start of establishing the NFC connection, the mobile device may be in a "wake on NFC" mode. In this mode, the NFC interface of the mobile device may remain inactive until the NFC interface receives an NFC signal from another NFC interface. At the same time, NFC interface of the print device may be in a host mode. In the host mode, the NFC interface if the print device may periodically emit NFC signals to seek out other nearby NFC interfaces.

The establishment of the NFC connection in step 202 may begin with an initiation handshake. The initiation handshake may start when a user taps the NFC interface of the mobile device to the NFC interface of the print device. As mentioned above, while the NFC interface of the print device may be in a host mode, it may periodically emit a ping message. NFC interface the mobile device may receive the ping message, causing the NFC interface of the mobile device to awake and reply with an acknowledgement message, which may be received by the NFC interface of the print device.

The above process, in some embodiments, may require exchange of authentication or encryption data (e.g., username, password, etc.) to ensure security of the transmission. In addition, the requirement of very close proximity of NFC transmissions serves to further ensure security of the exchange of data. Because NFC transceivers must be within a short distance—often less than a few inches—of each other to function, it is extremely unlikely that another NFC-enabled devices would be capable of intercepting the communication of data between the two NFC transceivers. Once the NFC connection has been established, the print device and the mobile device may communicate information between each other via the NFC connection and/or via a secondary communications link such as WiFi as discussed previously.

In step 204, the mobile operating system launches the tap-to-print application in response to the coupling of the mobile device with the print device. This launching may occur automatically, without requirement for user action, in response to the mobile device detection that it has been coupled to the print device. In other embodiments, the device may automatically prompt the user to confirm whether to launch the tap-to-print application. In certain embodiments, the mobile application is launched in the background and does not interfere with the already running foreground applications on the mobile device. The mobile application operates to identify the document to be printed in step 206 (as discussed later with respect to FIG. 2B).

The mobile application in step 208 may retrieve information corresponding to the document format and analyze whether or not the coupled print device is capable of printing the document. This may be performed in a variety of ways. For example, in some embodiments, the application may derive the print device profile and information from an NFC tag attached to the print device where the print device model, data related to the capabilities of the print device (e.g. color versus monochrome, whether it supports duplex etc.), or any combination thereof is encoded in the NFC tag. In certain embodiments, the application may derive the print device information over a local and/or remote network by connecting directly to the print device. The network may represent, for example, the Internet or other wide area public or private network. The network may represent, in further examples, a corporate or other intranet, and/or a smaller-scale, local or personal network, any of which may be implemented using standard network technology. In certain other embodiments, the print device information may be stored in a look up service external to the print device and the tap-to-print application may query the look up service.

In some embodiments, the tap-to-print application may infer print device capabilities from model information. Alternatively, the tap-to-print application may consult an external directory to receive information regarding print device capabilities based on the print device model information. In certain embodiments, if the tap-to-print application determines that the document is one of the standard formats, such as PDF, JPEG, WORD or other similar formats that are supported by all print devices, then the system may directly transmit the document to the print device.

If in step 208, if the tap-to-print application determines that the print device can print the document, it may transmit (210) the document to be printed to the print device directly or indirectly through an intermediary (e.g., server, computer, or the like) that is coupled (e.g., through one or more wired or wireless connections) to the print device, using the NFC communication interface and/or the secondary communications link. For example, these methods can be used to connect indirectly from mobile device to print device, e.g. mediated through an on-premise cloud server, or through an abstraction representing one or more print devices within an organization's printing service. The delivery of the document may use any appropriate protocol (e.g., LPR, RAW, IPP, WS-Print, etc.) and connection method including, but not limited to, storing as a file on a file system remote from the mobile device; and transmission as an email attachment. Those ordinarily skilled in the art will understand that there are many other ways in which the document could be transmitted to the print device and that the foregoing merely lists a limited number of examples, and that the embodiments herein are not limited to these examples.

The document to be printed may be sent in a commonly used page description language (PDL), such as the PostScript Language defined by Adobe Systems or the Print device Control Language (PCL) defined by Hewlett-Packard; alternatively it may be provided in a static page representation such as the Portable Document Format (PDF) defined by Adobe Systems, or the XML Paper Specification (XPS) defined by Microsoft; in some embodiments it may also be provided in a native office document format, such as a Microsoft Word, Microsoft PowerPoint or Open Office document. Those ordinarily skilled in the art would understand that there is practically an unlimited number of file formats currently in use by different organizations and more are being created. The embodiments herein are not limited to any specific file format type and work with all existing file formats, and will work with formats that are developed in the future.

However, if the tap-to-print application, in step 208, determines that the print device cannot print the document in its current format, the tap-to-print application may notify the user that the document cannot be printed. In certain embodiments, the tap-to-print application may optionally choose to choose to submit the document for conversion into a supported format before transmitting it based on print device capabilities received from the print device. In some embodiments, the conversion may happen internally within the mobile device. Alternatively, the conversion may happen externally using a conversion service. The document may be sent to the conversion service, and then be transmitted back to the mobile device for delivery to the print devices or it may be delivered directly to the print device.

In certain embodiments, the tap-to-print application may also transmit a user defined job ticket to the print device. The job ticket may contain instructions as to how the document within the print job is to be handled by the print device. The job ticket may, for example, specify that one or multiple copies of one document are to be printed. Similarly, the job ticket may direct that the document within the print job be finished in some manner (bound, stapled, folded, etc.). The tap-to-print application may formulate the job ticket in a format compatible to the print device based on user defined criteria. Those ordinarily skilled in the art will understand that there are many ways known in the art in which the tap-to-print application may formulate the job ticket without deviating from the principles of the current disclosure. Some examples of the formats may include Xerox job ticket format, internet printing protocol (IPP) job ticket format, and other similar formats. The tap-to-print application may formulate the job ticket within the mobile device, or it may use an external network service. The job ticket may be transmitted to the print device as part of the print job (with the document), or it may be transmitted separately using job delivery protocols known in the art.

The mobile device may perform steps 202-210, as disclosed in FIG. 2A in the background, while allowing the user to continue performing other tasks in the foreground on the mobile device. For example, the system may print a document while the user is viewing the document when the mobile device is coupled to the print device, without requiring the user to exit the document viewer.

Figure 2B:
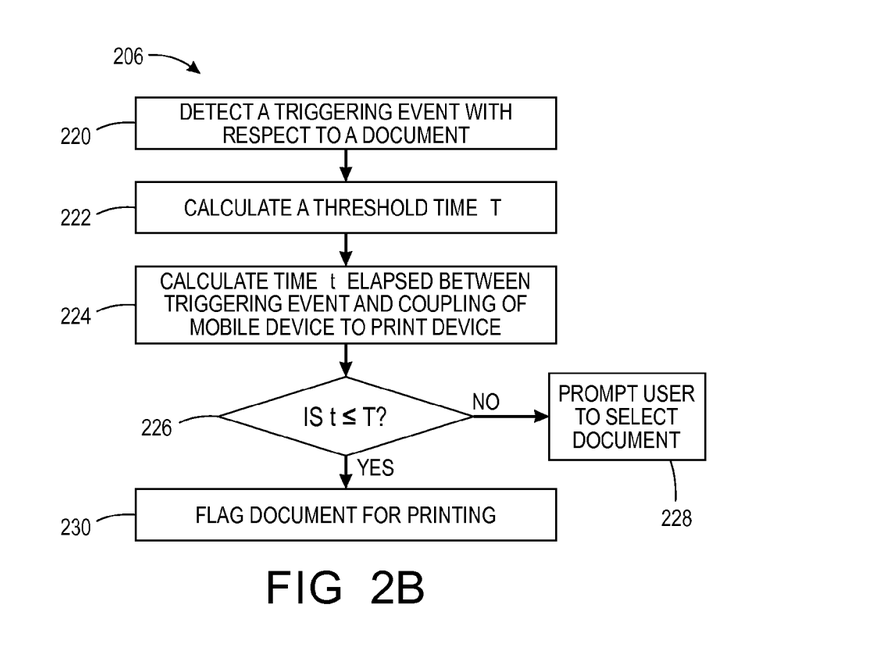
FIG. 2B depicts a flow chart example of a process for identifying a document to be printed on the mobile device via a tap-to-print application, according to an embodiment.

Referring now to FIG. 2B, a flowchart of the process of identifying the document to be printed using the tap-to-print application is illustrated. The process in FIG. 2B begins when the tap-to-print application installed on the mobile device detects a triggering event on the mobile device with respect to the document at step 220. The triggering event may be initiated by the user. In other embodiments, the triggering event may not be user-initiated. For example, a document may be downloaded without a user initiating it, such as in Dropbox.

As discussed previously, with respect to FIG. 2A, the tap-to-print application registers itself with the mobile operating system without making any modifications to the mobile operating system kernel which allows the application to monitor certain activities and/or folders on the mobile operating system. The tap-to-print application may be configured to monitor folders and/or events (resource activity) on the mobile device related to use of documents, to detect a user-initiated triggering event. The tap-to-print application may register itself with the mobile operating system, using techniques well known in the art, such that the mobile operating system may notify the tap-to-print application when changes are made to specified folders and/or resources. For example, the mobile operating system may notify the tap-to-print application when files are downloaded to, accessed, opened, created or edited in a folder specified by the tap-to-print application. Examples of folders may include the "downloads" folder, the "documents" folder, or any other folder that contains documents in a specified format (e.g., PDF, WORD, PowerPoint, JPEG etc.) on the mobile device. The folders may be present natively on the mobile device, or may be created by the user of the mobile device.

In certain embodiments, the tap-to-print application may also monitor events at the mobile application level. Examples of such applications may include a PDF document viewer, Adobe Reader, document management applications (e.g, Microsoft Office, file browser, etc.), and other similar applications.

Those ordinarily skilled in the art will understand that there are many other ways in which the tap-to-print application may detect the triggering event with respect to a document without making any modifications to the mobile operating system, which are not described here. Although aspects of the present disclosure are described in terms of a user opening and reading a PDF document and viewing it on the mobile device, the present disclosure is not limited to this example.

The tap-to-print application may further be configured to store the date and time log of the triggering event as time $t_1$, and tagging the document as "most recent." If the tap-to-print application detects a triggering event with respect to a second document at time $t_2$ (after time $t_1$), it may tag the second document as the "most recent" document and un-tag the first document. Those skilled in the art will understand that the tap-to-print application may use any other techniques not described here, but known in the art to identify the "most recent" document. This step may continue till the tap-to-print application is launched at time $t_0$.

The tap-to-print application may further be configured to calculate and store in a memory, a time "T," in step 222, based on at least the type of the triggering event, type of the document, and user behavior. The tap-to-print application may monitor the user's past behavior with respect to a particular triggering event and type of document to predict a time T for the most recent triggering event. For example, the tap-to-print application may calculate time T for a user opening and reading a PDF document, where the document contains "m" number of pages, by calculating an average time the user spent in reading PDF documents in the past using simple mathematical formulae, heuristic modeling, regression modeling, or any other techniques know in the art. The tap-to-print application may regularly update the time T. Tap-to-print application may also take other parameters into account in calculating time T, such as the list of application processes currently running on the mobile device, the type and speed of the mobile device processor, type of the document viewer etc.

As discussed previously, the tap-to-print application may be launched when the mobile device is coupled to the print device, at a time $t_0$. Next, in step 224, the tap-to-print application may calculate a time "t," as time elapsed between the triggering event with respect to a document tagged as most recent (as discussed previously), and the coupling of the mobile device with the print device, such that $t=t_0-t_n$ (where, $t_n$ is the detection time of the "most recent" document).

In step 226, the tap-to-print application may identify the document tagged as the "most recent" document as the document to be printed if it determines that the calculated "t" is less than or equal to T, and transmit the document to the print device. However, if the tap-to-print application determines that t is greater than T, then it may generate an error message and/or prompt the user to select the document to be printed.

In some embodiments, the tap-to-print application may ask the user to verify that the identified document is the document that the user intends to print. In certain other embodiments, the tap-to-print application may allow the user to configure the settings chose whether or not the tap-to-print application may transmit the document to the print device without user verification.

In certain embodiments, the tap-to-print application may be configured to identify more than one document as the documents to be printed (simultaneously), and transmit the identified documents to the print device. For example, the tap-to-print application may calculate times "t" for both the most recent document and the document un-tagged before the most recent document. It may then transmit both documents for printing if their respective calculated times "t" are each less than their respective threshold times "T".

Figure 2C:
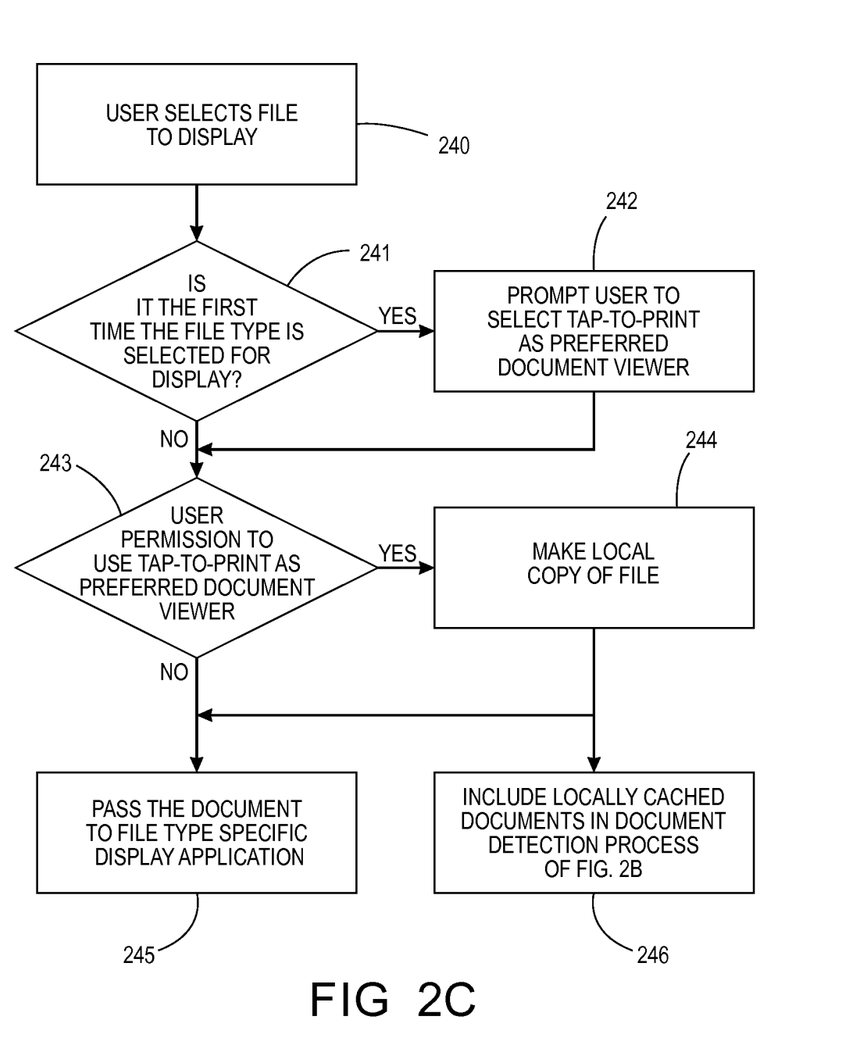
FIG. 2C depicts a flow chart example of a process for identifying a document to be printed on the mobile device via a tap-to-print application, according to an alternate embodiment.

Certain applications in a mobile device may cache documents in protected storage (sandboxing), and these documents are not accessible to other applications. Thus, the tap-to-print application may not be able to detect a triggering event in step 220, as discussed above. FIG. 2C depicts an alternate embodiment to detect a triggering event when the document is stored in a protected storage, or otherwise made inaccessible by a mobile application.

Referring now to FIG. 2C, a flowchart of the process for detecting a triggering event 220 using the tap-to-print application is illustrated. Typically, when a user of a mobile device opens a new document type for the first time, the mobile device asks the user to identify a mobile application to view the document. For example, when a user tries to open a PDF document for the first time on a mobile device, the user is prompted to identify the mobile application for viewing the document, such as Adobe. In this embodiment, the user may be given the option to use the tap-to-print application for viewing the document, as discussed below.

The process in FIG. 2C begins when the mobile operating system detects that a user has selected a file for display in step 240. The tap-to-print application may then determine 241 if it is the first time the particular file type has been selected for display. If it determines that the file type has previously been selected for display, the mobile operating system queries 243 the user's previous permissions' database to check whether or not the user has previously granted permission to use the tap-to-print application for viewing the document. If the user has previously granted permission for using tap-to-print to view the document, the application makes a local copy 244 of the file in its own protected storage and passes the document (pass through) to an appropriate application for viewing and/or handling the file type 245.

Thereafter, if the tap-to-print application is launched in step 204 (FIG. 2A), the document detection algorithm of FIG. 2B may include 246 the locally cached documents in its processing, as well.

If in step 241, the mobile operating system determines that it is the first time that the particular file type is selected for display, it may prompt the user 242 to select an application, from a list that includes the tap-to-print application, as the preferred document viewer. If the user does not select the tap-to-print application as the preferred document viewer, the document is passed 245 directly to the selected application for viewing the document and may not be available for tap-to-print if the viewing application stores it in a protected storage. The user preferences may be stored in a permissions database for future reference.

Figure 3:
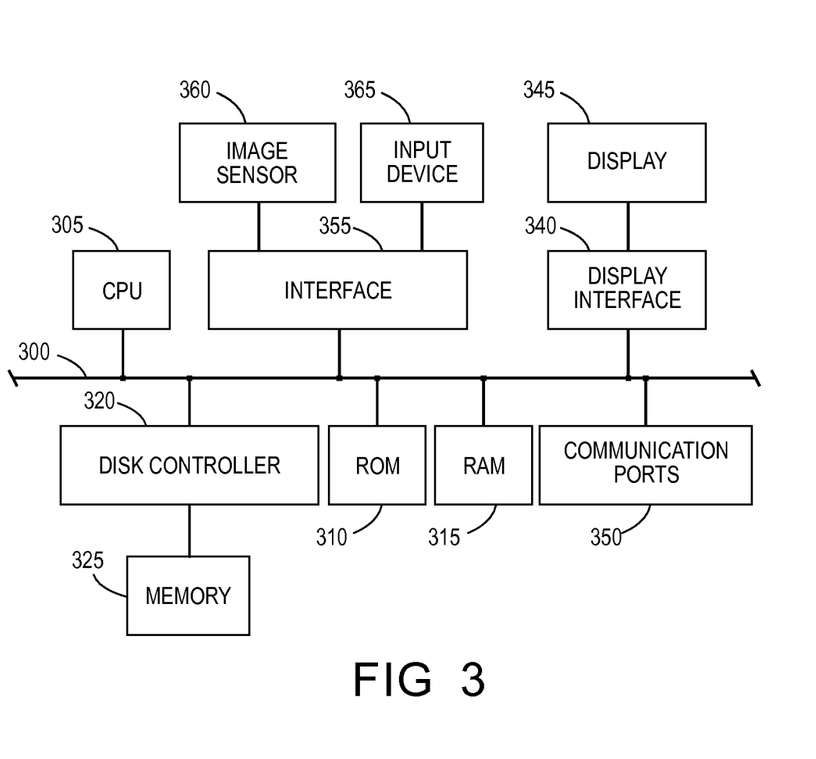
FIG. 3 depicts various embodiments of a mobile device for using the systems and processes described in this document.

The tap-to-print method and process as described above may be performed and implemented by an operator of a mobile electronic device having a processor and a communications interface (including NFC). FIG. 3 depicts an example of internal hardware that may be used to contain or implement the various computer processes and systems as discussed above. For example, the mobile electronic device discussed above may include hardware such as that illustrated in FIG. 3. An electrical bus 300 serves as an information highway interconnecting the other illustrated components of the hardware. CPU 305 is a central processing unit of the system, performing calculations and logic operations required to execute a program. CPU 305, alone or in conjunction with one or more of the other elements, is a processing device, computing device or processor as such terms are used within this disclosure. A CPU or "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments. Read only memory (ROM) 310 and random access memory (RAM) 315 constitute examples of memory devices.

A controller 320 interfaces with one or more optional memory devices 325 that service as date storage facilities to the system bus 300. These memory devices 325 may include, for example, an external or internal disk drive, a hard drive, flash memory, a USB drive or another type of device that serves as a data storage facility. As indicated previously, these various drives and controllers are optional devices. Additionally, the memory devices 325 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 310 and/or the RAM 315. Optionally, the program instructions may be stored on a non-transitory, computer readable medium such as a compact disk, a digital disk, flash memory, a memory card, a USB drive, an optical disc storage medium, and/or other recording medium.

An optional display interface 340 may permit information from the bus 300 to be displayed on the display 345 in audio, visual, graphic or alphanumeric format. Communication with external devices may occur using various communication ports 350. A communication port 350 may be attached to a communications network, such as the Internet, a local area network or a cellular telephone data network.

The hardware may also include an interface 355 which allows for receipt of data from input devices such as an imaging sensor 360 of a scanner or other input device 365 such as a keyboard, a mouse, a joystick, a touchscreen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of printing a document from a mobile device comprising:
   coupling the mobile device to a print device;
   in response to the coupling, launching a tap-to-print software application on the mobile device, wherein the tap-to-print software application does not modify an operating system of the mobile device;
   via a processor of the mobile device executing the tap-to-print software application, wherein the tap-to-print application causes the processor to:
      automatically identify a document to be printed, wherein identifying the document to be printed comprises:
         determining a time $t_0$ at which the coupling occurred;
         detecting a triggering event with respect to a most recent document at time $t_n$;
         determining a threshold time value, T;
         determining, whether $(t_0-t_n) \leq T$; and
         if it is determined that $(t_0-t_n) \leq T$, then identifying the most recent document as the document to be printed, else prompting a user of the mobile device to identify a second document as the document to be printed; and
      transmit the document to be printed to the print device.

2. The method of claim 1, wherein determining the threshold time value T is based on at least one of the following: a type of the most recent document, a type of the triggering event, or past user behavior.

3. The method of claim 1, wherein the triggering event comprises one or more of the following: downloading the first document, opening the first document, reading the first document, creating the first document, and editing the first document.

4. The method of claim 1, wherein identifying the document to be printed further comprises querying a tap-to-print software application local database for detecting the triggering event with respect to the most recent document.

5. The method of claim 4, further comprising:
   detecting a user selection of a file for display;
   determining a file type of the file;
   determining if the tap-to-print application has user permission to display the file type;
   saving a copy of the file in the tap-to-print software application local database if it is determined that tap-to-print application has user permission to display the file type; and
   sending the file to an appropriate mobile application for display to the user.

6. The method of claim 1, further comprising determining whether or not the print device is capable of printing the print document.

7. The method of claim 1, wherein coupling the mobile device to the print device comprises establishing a near field communications link upon detection that the mobile device and the print device are within a communication range of each other.

8. The method of claim 1, further comprising establishing a secondary communications link between the mobile device and the print device, wherein the secondary communication link has a communication range that is larger than that of the near field communications link.

9. The method of claim 1, further comprising transmitting a job ticket from the mobile device to the print device.

10. The method of claim 1, further comprising prompting a user of the mobile device to verify the identified print document.

11. A system for printing a document from a mobile device comprising:
   a non-transitory, computer readable memory;
   one or more processors; and
   a computer-readable medium containing programming instructions that, when executed by the one or more processors, cause the system to:
      couple the mobile device to a print device;
      in response to the coupling, launch a tap-to-print software application on the mobile device, wherein the tap-to-print software application does not modify an operating system of the mobile device;
      automatically identify a document to be printed via the tap-to-print application wherein identifying the document to be printed comprises:
         determining a time $t_0$ at which the coupling occurred;
         detecting a triggering event with respect to a most recent document at time $t_n$;
         determining a threshold time value, T;
         determining, whether $(t_0-t_n) \leq T$; and
         if it is determined that $(t_0-t_n) \leq T$, then identifying the most recent document as the document to be printed, else prompting a user of the mobile device to identify a second document as the document to be printed; and
      by the tap-to-print application, transmit the document to be printed to the print device.

12. The system of claim 11, wherein determining the threshold time value T is based on at least one of the following: a type of the most recent document, a type of the triggering event, or past user behavior.

13. The system of claim 11, wherein the triggering event comprises one or more of the following: downloading the first document, opening the first document, reading the first document, creating the first document, and editing the first document.

14. The system of claim 11, further comprising programming instructions that, when executed by the one or more processors, cause the system to determine whether or not the print device is capable of printing the print document.

15. The system of claim 11, wherein coupling the mobile device to the print device comprises establishing a near field communications link upon detection that the mobile device and the print device are within a communication range of each other.

16. The system of claim 11, further comprising programming instructions that, when executed by the one or more processors, cause the system to establish a secondary communications link between the mobile device and the print device, wherein the secondary communication link has a communication range that is larger than that of the near field communications link.

17. The system of claim 11, further comprising programming instructions that, when executed by the one or more processors, cause the system to transmit a job ticket from the mobile device to the print device.

18. The system of claim 11, further comprising programming instructions that, when executed by the one or more processors, cause the system to prompt a user of the mobile device to verify the identified print document.

19. A non-transitory machine-readable medium containing programming instructions for a tap-to-print application that, when executed cause a processor to perform operations comprising:
  coupling the mobile device to a print device;
  in response to the coupling, launching the tap-to-print application software on the mobile device, wherein the tap-to-print application does not modify an operating system of the mobile device;
  automatically identifying a document to be printed via the tap-to-print application wherein identifying the document to be printed comprises:
    determining a time $t_0$ at which the coupling occurred;
    detecting a triggering event with respect to a most recent document at time $t_n$;
    determining a threshold time value, T;
    determining, whether $(t_0-t_n) \leq T$; and
  if it is determined that $(t_0-t_n) \leq T$, then identifying the most recent document as the document to be printed, else prompting a user of the mobile device to identify a second document as the document to be printed; and
  by the tap-to-print application, transmitting the document to be printed to the print device.

* * * * *